United States Patent

Hodges

[11] Patent Number: 6,070,910
[45] Date of Patent: Jun. 6, 2000

[54] PUSH-IN CLOSET FLANGE

[75] Inventor: B. Eugene Hodges, Greenville, Mich.

[73] Assignee: James Bruno, Ada, Mich.

[21] Appl. No.: 08/953,181

[22] Filed: Oct. 17, 1997

[51] Int. Cl.[7] .............................. F04B 5/48; F16L 23/09; E03D 11/00
[52] U.S. Cl. ................. 285/2; 285/15; 285/42; 285/56; 285/59; 4/252.6
[58] Field of Search .................. 285/15, 42, 56, 285/60, 336, 346, 338; 52/20; 4/252.1, 252.6

[56] References Cited

U.S. PATENT DOCUMENTS

| | | |
|---|---|---|
| 222,713 | 12/1879 | Lawson . |
| 978,404 | 12/1910 | Schultz et al. . |
| 2,152,719 | 4/1939 | Williams . |
| 2,479,837 | 8/1949 | Hollaender . |
| 3,012,252 | 12/1961 | Gaddy . |
| 3,238,538 | 3/1966 | Turner . |
| 4,502,166 | 3/1985 | Brown, Sr. . |
| 4,574,402 | 3/1986 | Brown, Sr. . |
| 4,722,556 | 2/1988 | Todd . |
| 5,291,619 | 3/1994 | Adorjan . |
| 5,297,817 | 3/1994 | Hodges ................... 285/1 X |

*Primary Examiner*—Vit Miska
*Attorney, Agent, or Firm*—Bullwinkle Partners, Ltd.

[57] ABSTRACT

A closet flange with a body portion having a tapered end and a plurality of grooves circumferentially disposed about the tapered end. The grooves increase in diameter in the upstream direction and are configured to receive an elastic O-ring. As the closet flange is inserted into a drain pipe the O-ring travels from groove to groove providing an increasingly tighter fit. The flange is installed without tools by pushing the flange into the end of the pipe until the desired tightness is achieved.

6 Claims, 2 Drawing Sheets

PUSH-IN CLOSET FLANGE

BACKGROUND

1. Field of the Invention

This patent relates to closet flanges. More particularly, this patent relates to a closet flange which can installed on top of a sewage drain pipe without the use of tools to form a watertight seal, in place of conventional cast iron closet flanges.

2. Description of the Related Art

Conventional cast iron closet flanges typically are connected to the top end of a sewage drain pipe by means of a lead and oakum sealed joint. This method entails beating down oakum fiber with a chisel or other implement to seal the joint between the drain pipe and the closet flange, pouring hot lead into the joint, and beating down the cooled lead. This method of installation is difficult, time consuming and costly.

Several easier-to-use replacement closet flanges have been proposed. For example, my U.S. Pat. No. 5,297,817 describes an improved closet flange with telescoping ability that can replace a 4-inch cast iron closet flange and does not require caulking or a lead and oakum seal. Instead, the flange slips inside the drain pipe and is tightened with three bolts. While this flange is useful where telescoping capability is desired, it requires a tool to tighten the bolts.

Adorjan Patent No. 5,291,619 describes a closet flange having grooves of varying diameters and a complex-shaped gasket that can be stretched over the flange to fit in a selected groove. The seal is placed within the proper groove before the flange is installed in the drainage pipe. A disadvantage of the Adorjan flange is that it requires trial and error to determine the proper groove in which to place the gasket.

It is therefore a principal object of the present invention to provide an improved closet flange that can replace conventional cast iron closet flanges requiring a lead and oakum sealed joint.

A further object is to provide a closet flange that can be installed without the use of tools.

A still further object is to provide a closet flange having a movable O-ring seal which, as the closet flange is installed, makes incremental adjustments according to the diameter of the drain pipe in order to provide a watertight fit.

Another object is to provide a closet flange which can be used with 3" or 4" schedule 40 P.V.C. or A.B.S. pipe as well as cast iron pipe.

SUMMARY OF THE INVENTION

The present invention is a closet flange comprising a shoulder portion and a substantially cylindrical body portion extending from the shoulder portion in a downstream direction. The body portion has a plurality of grooves circumferentially disposed about its downstream end. The downstream end of the body portion is tapered such that the grooves increase in diameter in the upstream direction. These grooves are configured to receive an elastic seal or O-ring. The O-ring is of sufficient elasticity to travel from groove to groove as the closet flange is inserted into a drain pipe.

The flange is installed without tools by pushing the flange into the end of a drain pipe. When the flange is inserted into the pipe it moves in discrete increments as the O-ring travels from groove to groove. The flange is inserted until a good watertight seal is achieved between the O-ring and the pipe. The farther the flange is pushed into the drain pipe, the tighter the watertight seal becomes.

In one alternative embodiment, the flange body is not tapered and has one groove instead of many. 0-rings of different circumferences are used to accommodate drain pipes of varying internal diameters.

THE DRAWINGS

DETAILED DESCRIPTION OF THE INVENTION

Figure 1:
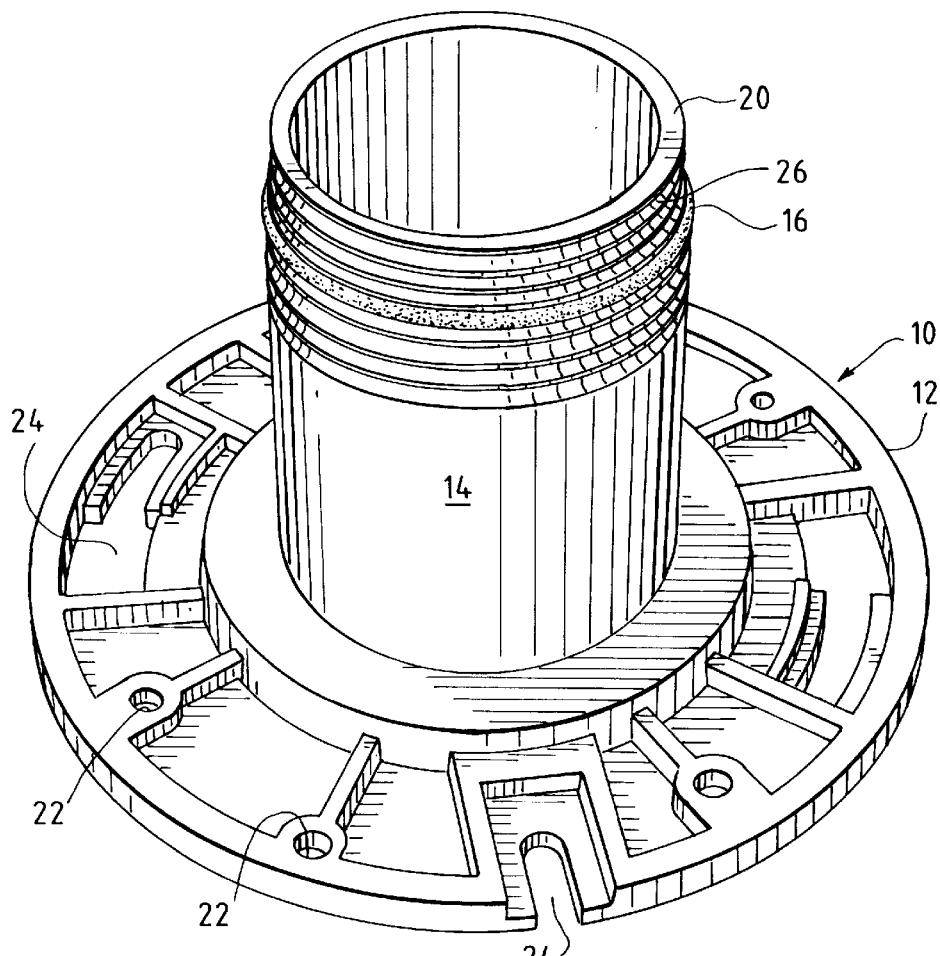
FIG. 1 is a perspective view of the preferred embodiment of the closet flange of the present invention.
Figure 2:
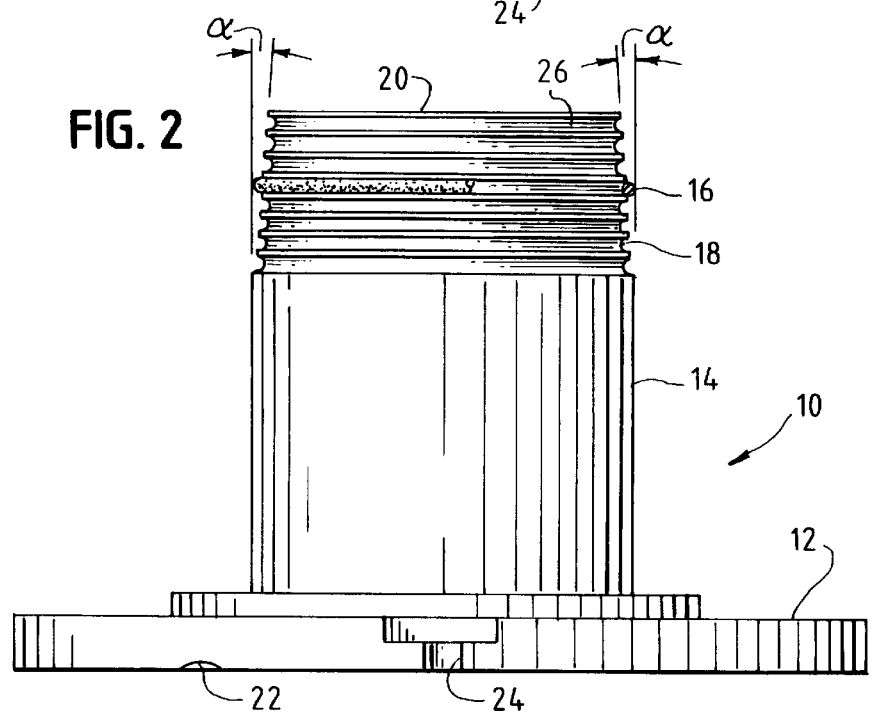
FIG. 2 is a side elevational view of the flange of FIG. 1.

Turning to the drawings, there is shown in FIGS. 1 and 2 the preferred embodiment of the push-in closet flange 10 of the present invention. The flange 10 comprises a shoulder portion 12, a substantially cylindrical body portion 14 and a seal or O-ring 16. The flange 10 is designed to be inserted into the top end of a sewage drain pipe to provide a watertight fit, and then receive a toilet or other plumbing fixture (not shown).

The closet flange 10 has a plurality of grooves 18 circumferentially disposed about the downstream end 20 of the flange body and configured to accept the seal 16. Significantly, the downstream end 20 is tapered such that the grooves 18 increase in diameter in the upstream direction. The seal 16 is sufficiently elastic to travel from groove to groove as the flange 10 is inserted into the drain pipe.

Displaced around the shoulder 12 are a plurality of openings 22 and slots 24 for receiving bolts or the like which are used to secure the flange 10 to the toilet or other plumbing fixture.

The closet flange 10 is installed without tools by pushing the flange 10 into the end of a drain pipe. When the flange 10 is inserted into the pipe, the flange 10 moves in small discrete increments as the O-ring 10 slips or rolls from groove to groove. The flange 10 is inserted until a good watertight seal is achieved between the O-ring 16 and the pipe.

Figure 3:
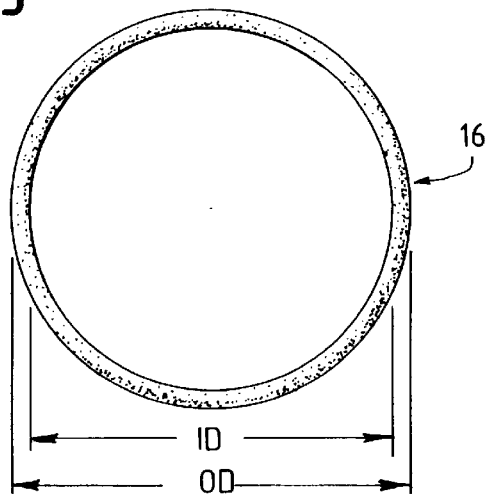
FIG. 3 is a top plan view of the O-ring seal of the present invention.
Figure 4:
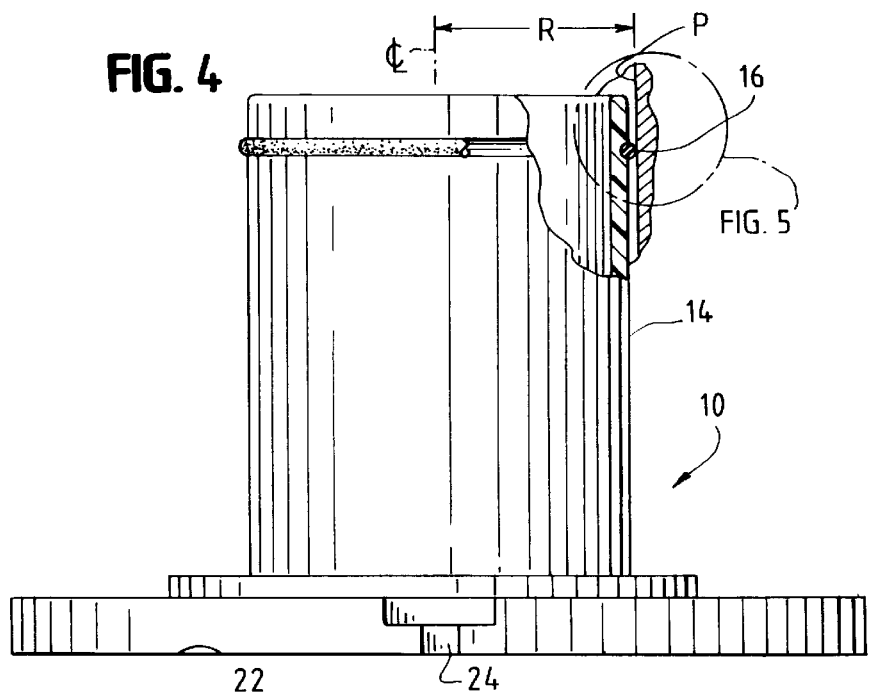
FIG. 4 is a side elevational view of an alternative embodiment of the present invention.
Figure 5:
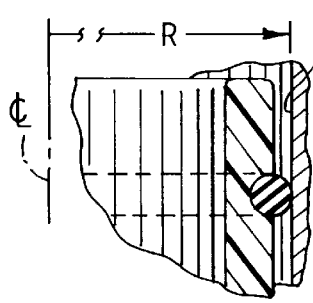
FIG. 5 is an enlarged partial view of the embodiment shown in FIG. 4.
Figure 6:
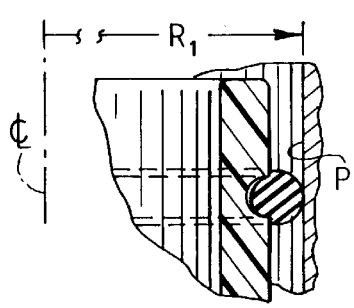
FIG. 6 is an enlarged partial view of the embodiment shown in FIG. 4 with an O-ring having a larger outside diameter.
Figure 7:
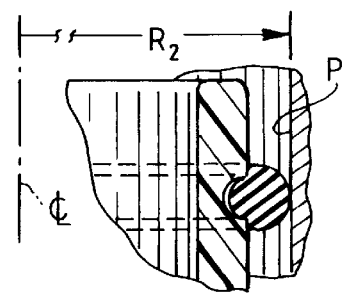
FIG. 7 is an enlarged partial view of the embodiment shown in FIG. 4 with an O-ring having a still larger outside diameter.

As best shown in FIG. 3, in the preferred embodiment the push-in flange 10 uses a simple toroidal-shaped ring (O-ring) 16 instead of the more complex-shaped gaskets disclosed in other patents. The toroidal shape allows the O-ring 16 to roll from groove to groove as the flange 10 is inserted into a drain pipe.

The inside diameter of the O-ring 16 ("ID" in FIG. 3) is substantially the same as the diameter of the first (smallest) groove 26. As the flange is inserted into a pipe and the O-ring 16 travels from one groove 18 to the next, slightly larger, groove 18, the O-ring 16 stretches, increasing its ID to accommodate the increasingly larger grooves.

Preferably, the outside diameter (OD) of the O-ring 18 in its relaxed state is slightly greater than the outer wall diameter of the flange body. As a result, when the flange 10 is inserted into a pipe the O-ring is compressed between the flange 10 and the pipe inner wall. As the O-ring travels from groove to groove, an increasingly tighter fit is achieved. The flange 10 may be inserted until the user obtains the desired fit tightness.

The flange 10 may be molded of resilient plastic material such as polyethylene, polypropylene, PVC, nylon, or other suitable material. The seal 16 preferably is made from neoprene, although other suitable materials may be used.

The flange 10 can be used with cast iron pipe and, unlike conventional cast iron flanges, may also be used with P.V.C. or A.B.S. pipe.

The flange 10 is designed to be used with pipe having an inside diameter of three inches or greater, such as 3" schedule 40 pipe. Because the flange 10 fits inside the pipe, it effectively reduces the internal diameter of the conduit. Standard plumbing regulations do not allow internal pipe diameters of less than about three inches.

The present invention can be used to replace broken cast iron closet flanges in old buildings where the cost of replacing the flange with a conventional flange, including the cost of cleaning out the old lead joint, is prohibitive. The present invention is also useful in new construction where 4" cast iron, P.V.C. or A.B.S. pipe is used. In new buildings, drains pipes are typically installed first and the concrete floor poured later. When a conventional closet flange is used, it is necessary to chip away the concrete from around the pipe in order to make room for the flange. This method of installing flanges is difficult, time consuming and expensive. The present invention, by contrast, fits inside the existing pipe, eliminating the need to chip concrete from around the pipe after the concrete floor is poured and dried.

In one alternative embodiment shown in FIGS. 4–7, the flange body 14 is not tapered, and O-rings of different outside diameters (=2R, $2R_1$ and $2R_2$ respectively) are used. In this alternative embodiment, the body portion 14 has a single groove circumferentially disposed about its downstream end. A plurality of elastic O-rings 16 are provided, each having an inside diameter selected to fit snugly within the groove, but varying outside diameters to provide watertight seals with different sized drain pipes P.

In another alternative embodiment (not shown), the flange body is tapered as in FIG. 2 but has no grooves within which the O-ring sits. Instead, the O-ring is stretched over the flange body. As the flange is pushed into a pipe, the O-ring is compressed between the flange body and the pipe and moves upwardly along the flange body toward the shoulder until a snug, watertight fit is achieved.

Of course, many modifications and other embodiments of the invention will be recognized by one skilled in the art in view of the foregoing teachings. For example, although the figures depict a closet flange having grooves and a taper extending only part way up the flange body 14, it is anticipated that the grooves and taper can extend farther up the body, even to where the body is connected to the shoulder 12. Therefore, the invention is not to be limited to the exact construction and operation described, and any suitable modifications are to be included within the scope of the claims allowed herein.

I claim as my invention:

1. A closet flange comprising:
   a shoulder portion; and
   a body portion extending from the shoulder portion in a downstream direction and having an outside diameter, the body portion having a plurality of grooves circumferentially disposed about the downstream end of the body portion and configured to accept an elastic O-ring, the O-ring being of sufficient elasticity to travel from groove to groove in a sealing relationship as the closet flange is inserted into a drain pipe.

2. The closet flange of claim 1 wherein the grooves increase in diameter in the upstream direction.

3. The closet flange of claim 1 wherein the downstream end of the body portion is tapered such that the grooves increase in diameter in the upstream direction.

4. The closet flange of claim 1 wherein the outside diameter of the O-ring in its relaxed state is greater than the outside diameter of the flange body portion.

5. A closet flange for insertion into a drain pipe comprising:
   a shoulder portion that extends above the drain pipe;
   a substantially cylindrical body portion for inserting into the drain pipe and extending from the shoulder portion in a downstream direction and having a groove circumferentially disposed about its downstream end; and
   interchangeable elastic O-rings, each having an inside diameter selected to fit snugly within the groove, but varying outside diameters to provide watertight seals with different-sized drain pipes.

6. A closet flange for insertion into a drain pipe comprising:
   a shoulder portion defining a plane;
   a substantially cylindrical body portion extending substantially perpendicular from the shoulder portion plane in a downstream direction;
   a series of grooves circumferentially disposed about the end of the body portion away from the shoulder portion, each groove having a diameter larger than the adjacent groove away from the shoulder portion; and
   an O-ring configured to travel from groove to groove as the closet flange is pushed into the drain pipe;
   wherein pushing the closet flange into the drain pipe creates an increasingly tighter seal.

* * * * *